(12) United States Patent
Oh

(10) Patent No.: US 10,890,482 B2
(45) Date of Patent: Jan. 12, 2021

(54) PIXEL CIRCUIT FOR GENERATING AN OUTPUT SIGNAL IN RESPONSE TO INCIDENT RADIATION

(71) Applicant: Himax Imaging Limited, Tainan (TW)

(72) Inventor: Hack soo Oh, Tainan (TW)

(73) Assignee: Himax Imaging Limited, Tainan (TW)

( * ) Notice: Subject to any disclaimer, the term of this patent is extended or adjusted under 35 U.S.C. 154(b) by 103 days.

(21) Appl. No.: 16/252,545

(22) Filed: Jan. 18, 2019

(65) Prior Publication Data
US 2020/0232846 A1 Jul. 23, 2020

(51) Int. Cl.
*G01J 1/44* (2006.01)
(52) U.S. Cl.
CPC ............ *G01J 1/44* (2013.01); *G01J 2001/446* (2013.01)
(58) Field of Classification Search
CPC .................... H04N 5/37452; H04N 5/3559
See application file for complete search history.

(56) References Cited

U.S. PATENT DOCUMENTS

2006/0192870 A1* 8/2006 Shoho ............... H04N 5/37457
348/294
2018/0278869 A1 9/2018 Fan

FOREIGN PATENT DOCUMENTS

| TW | I398164 | B1 | 6/2013 |
| TW | 201537983 | A | 10/2015 |
| TW | 201637435 | A | 10/2016 |

* cited by examiner

*Primary Examiner* — Thanh Luu
(74) *Attorney, Agent, or Firm* — Winston Hsu

(57) ABSTRACT

A pixel circuit is provided. The pixel circuit may comprise a photodiode, a comparator circuit, a capacitor, a first switch circuit, a second switch circuit and a third switch circuit. The photodiode is arranged to accumulate charges in response to incident radiation, to generate a photodiode signal. The comparator circuit is arranged to generate an output signal according to a voltage level of a specific node within the pixel circuit during a read-out phase of the pixel circuit. The capacitor is coupled between a control voltage terminal of the pixel circuit and the specific node, the first switch circuit is coupled between the photodiode and the specific node, the second switch circuit is coupled between the specific node and an output terminal of the pixel circuit, and the third switch circuit is coupled between the output terminal and the comparator circuit.

5 Claims, 4 Drawing Sheets

PIXEL CIRCUIT FOR GENERATING AN OUTPUT SIGNAL IN RESPONSE TO INCIDENT RADIATION

BACKGROUND OF THE INVENTION

1. Field of the Invention

The present invention is related to electronic circuits, and more particularly, to a pixel circuit.

2. Description of the Prior Art

Regarding architecture of a related art pixel circuit, a voltage level of a supply voltage may be a limitation for voltage swings (e.g. available voltage range) of certain nodes within the pixel circuit. In addition, various components within the pixel circuit may introduce noise such as read out noise, which may affect performance of the pixel circuit. Thus, there is a need for a novel pixel circuit in order to solve the related art problems.

SUMMARY OF THE INVENTION

An objective of the present invention is to provide a pixel circuit that is less limited by a voltage level of a supply voltage within the pixel circuit.

Another objective of the present invention is to provide a pixel circuit that introduces less read-out noise, to improve overall performance of the present invention.

At least one embodiment of the present invention provides a pixel circuit, where the pixel circuit may comprise a photodiode, a comparator circuit, a capacitor, a first switch circuit, a second switch circuit and a third switch circuit. The photodiode is arranged to accumulate charges in response to incident radiation, to generate a photodiode signal. The comparator circuit is arranged to generate an output signal according to a voltage level of a specific node within the pixel circuit during a read-out phase of the pixel circuit. The capacitor is coupled between a control voltage terminal of the pixel circuit and the specific node, the first switch circuit is coupled between the photodiode and the specific node, the second switch circuit is coupled between the specific node and an output terminal of the pixel circuit, and the third switch circuit is coupled between the output terminal and the comparator circuit. For example, a ramp signal may be applied to the control voltage terminal during the read-out phase, to generate a voltage transition of the output signal at a specific time point.

One of advantages of the present invention is that additional supply voltage is not needed in the present invention architecture, and the number of devices introducing read-out noise is less than that of the related art architecture. As a result, the present invention can solve the aforementioned problems without introducing unwanted side effects, or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
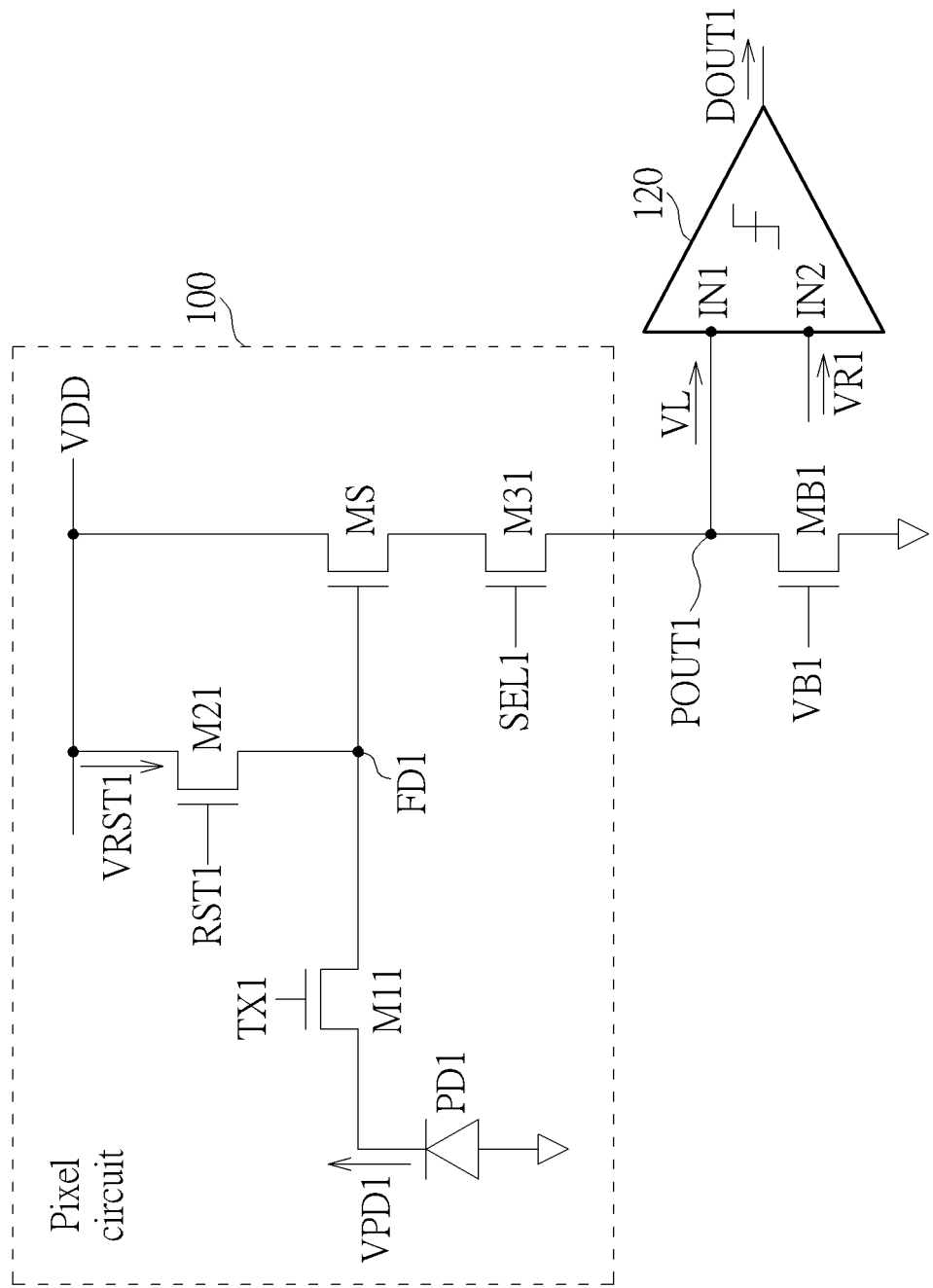
FIG. 1 is a diagram illustrating a pixel circuit according to an embodiment of the present invention.

FIG. 1 is a diagram illustrating a pixel circuit 100 according to an embodiment of the present invention, where the pixel circuit 100 may comprise a photodiode PD1, a plurality of transistors M11, M21, M31 and MS. In this embodiment, the transistors M11, M21 and M31 may be regarded as switch circuits, where the control signals TX1, RST1 and SEL1 are applied to gate terminals of the transistors M11, M21 and M31 to control these switch circuits, respectively. Additionally, the transistor MS may be an input device of a source follower in order to perform a read-out operation. The transistor M11 is coupled between the photodiode PD1 and a floating diffusion (FD) node FD1, the transistor M21 is coupled between the FD node FD1 and a supply voltage terminal VDD. A gate terminal and a drain terminal of the transistor MS are coupled to the FD node FD1 and the supply voltage terminal VDD, respectively, and the transistor M31 is coupled between a drain terminal of the transistor MS and an output terminal POUT1. Note that, a current source device such as MB1 (controlled by a bias signal VB1) is coupled to the output terminal POUT1 to provide the source follower (e.g. the transistor MS) of the pixel circuit 100 with a bias current, but the present invention is not limited thereto. In this embodiment, the output terminal is further coupled to an input terminal IN1 of a comparator circuit 120, and the comparator circuit 120 may generate an output signal DOUT1 according to an output signal VL applied to the input terminal IN1 and a ramp signal VR1 applied to an input terminal IN2 of the comparator circuit 120, for example, when the ramp signal VR1 is greater than the output signal VL, the output signal DOUT1 may be high (e.g. a logic high signal), and when the ramp signal VR1 is less than the output signal VL, the output signal DOUT1 may be low (e.g. a logic low signal); for another example, when the ramp signal VR1 is greater than the output signal VL, the output signal DOUT1 may be low, and when the ramp signal VR1 is less than the output signal VL, the output signal DOUT1 may be high; but the present invention is not limited thereto.

Figure 2:
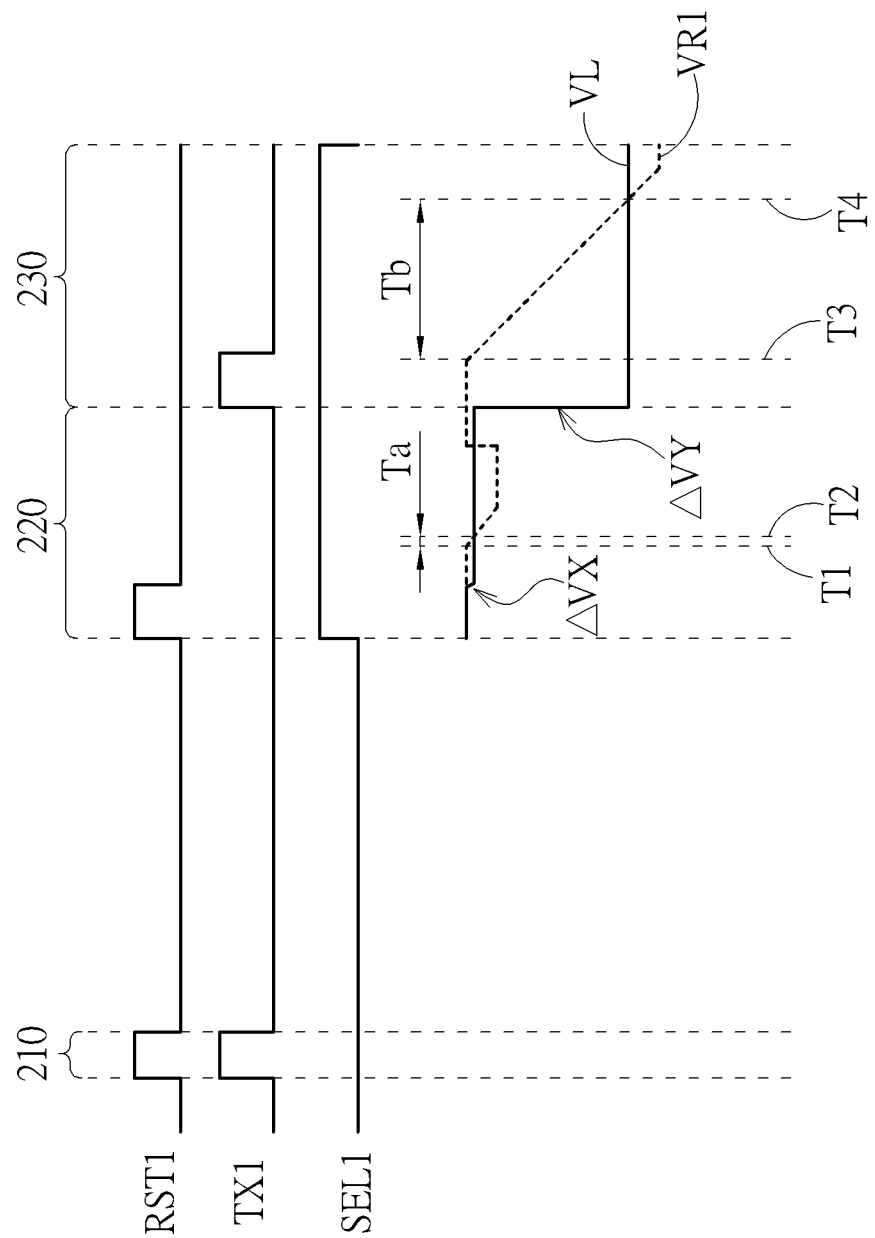
FIG. 2 is a diagram illustrating associated signals of the architecture shown in FIG. 1 according to an embodiment of the present invention.

Please refer to FIG. 2 in conjunction with FIG. 1, where FIG. 2 is a diagram illustrating control signals {TX1, RST1, SEL1}, the output signal VL and the ramp signal VR1 shown in FIG. 1 according to an embodiment of the present invention. Note that, the control signals {TX1, RST1, SEL1} are illustrated as logic signals in FIG. 2, but the present invention is not limited thereto.

During a phase 210, the control signals RST1 and TX1 are high and the control signal SEL1 is low, the photodiode PD1 and the FD node FD1 may be reset by the supply voltage terminal VDD, and after the control signals RST1 and TX1 turn to low, the photodiode PD1 may start to accumulate charges in response to incident radiation, to generate a photodiode signal VPD1. When the control signal SEL1 changes to high from low, the source follower (e.g. the transistor MS) may be enabled, and the pixel circuit 100 may start to perform read-out operations.

During a phase 220, when the control signals RST1 and SEL1 are high and the control signal TX1 is low, the reference signal VRST1 may be transmitted to the FD node FD1 and then be read out to the output terminal POUT1, for example, a voltage level of the output signal VL during the phase 220 may represent the reference signal VRST1, but the present invention is not limited thereto. Note that, the output signal VL may have a voltage drop ΔVX when the control signal RST1 turns to low due to non-ideal switch circuit(s) such as the transistor M21, but the present invention is not limited thereto. After the control signal RST1 turns to low, a voltage level of the ramp signal VR1 may start to decrease by a specific slope at a time point T1, where the voltage level of the ramp signal VR1 may become less than the voltage level of the output signal VL at a time point T2, and relative time information of the time point T2 with respect to a reference time point such as the time point T1 (e.g. a time difference Ta between the time points T1 and T2) may indicate detection information carried by the reference signal VRST1.

During a phase 230, when the control signals TX1 and SEL1 are high and the control signal RST1 is low, the photodiode signal VPD1 may be transmitted to the FD node FD1 and then be read out to the output terminal POUT1 as shown by a voltage drop ΔVY, for example, the voltage level of the output signal VL during the phase 230 may represent the photodiode signal VPD1, but the present invention is not limited thereto. Similar to the associated operation of the ramp signal VR1 during the phase 220, relative time information of the time point T4 with respect to a reference time point such as the time point T3 (e.g. a time difference Tb between time points T3 and T4) may indicate detection information carried by the photodiode signal VPD1. A final read-out signal of the pixel circuit 100 may be indicated by a difference between the time difference Ta and Tb. Note that, read-out noise of the pixel circuit 100 may be introduced by the transistor MS and input device(s) such as input transistors of the comparator circuit 120, but the present invention is not limited thereto.

Figure 3:
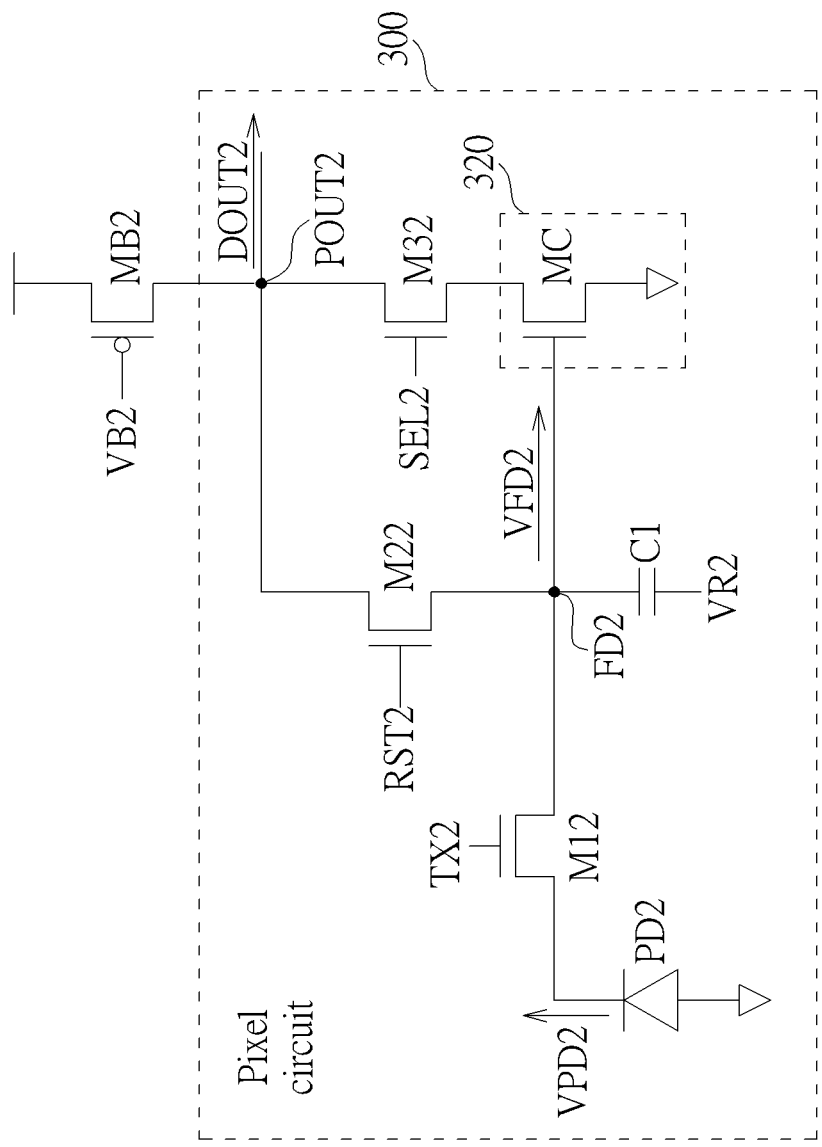
FIG. 3 is a diagram illustrating a pixel circuit according to an embodiment of the present invention.

FIG. 3 is a diagram illustrating a pixel circuit 300 according to an embodiment of the present invention. The pixel circuit 300 may comprise a photodiode PD2, a comparator circuit 320, a capacitor C1, a first switch circuit, a second switch circuit and a third switch circuit, where each of the first switch circuit, the second switch circuit and the third switch circuit may comprise at least one transistor, for example, the first switch circuit, the second switch circuit and the third switch circuit may comprise transistors M12, M22 and M32, respectively, and the transistors M12, M22 and M32 are controlled by control signals TX2, RST2 and SEL2 through gate terminals thereof, respectively, but the present invention is not limited thereto. In this embodiment, the comparator circuit 320 may generate an output signal of the pixel circuit 300 (e.g. an output signal DOUT2 on an output terminal POUT2 of the pixel circuit 300) according to a voltage level of a specific node such as an FD node FD2 (e.g. an FD signal VFD2 of the FD node FD2) within the pixel circuit 300 during a read-out phase of the pixel circuit 300. The capacitor C1 is coupled between a control voltage terminal of the pixel circuit 300 and the FD node FD2, wherein a ramp signal VR2 may be applied to this control voltage terminal during the read-out phase in order to control the voltage level of the FD node FD2, to generate a voltage transition (e.g. low to high, or high to low) of the output signal of the pixel circuit 300 at a specific time point. In this embodiment, the comparator circuit 320 may comprise a transistor MC, where the transistor M12 is coupled between the photodiode PD2 and the FD node FD2, the transistor M22 is coupled between the FD node FD2 and the output terminal POUT2, and the transistor M32 is coupled between the output terminal POUT2 and the comparator circuit 320 (e.g. a drain terminal of the transistor MC therein). In addition, a gate terminal and a source terminal of the transistor MC are coupled to the FD node FD2 and a reference voltage (e.g. a ground voltage), respectively. Note that, a current source device such as the transistor MB2 (controlled by a bias signal VB2) is coupled to the output terminal POUT2 to provide the comparator circuit 320 (e.g. the transistor MC therein) of the pixel circuit 100 with a bias current, but the present invention is not limited thereto.

The present invention pixel circuit such as the pixel circuit 300 may utilizes an internal signal to be a reset level (or a reference level) of the pixel circuit 300, where the supply voltage terminal VDD shown in FIG. 1 can be omitted in the architecture shown in FIG. 3. As a result, an available voltage range of the FD node FD2 (e.g. an available range of the FD signal VFD2) cannot be limited by the voltage level of the supply voltage terminal VDD that is omitted in the architecture shown in FIG. 3. Although read-out noise of the pixel circuit 300 may be introduced by the transistor MC, the number of components that introduce read-out noise within the pixel circuit 300 is less than that within the pixel circuit 100.

Figure 4:
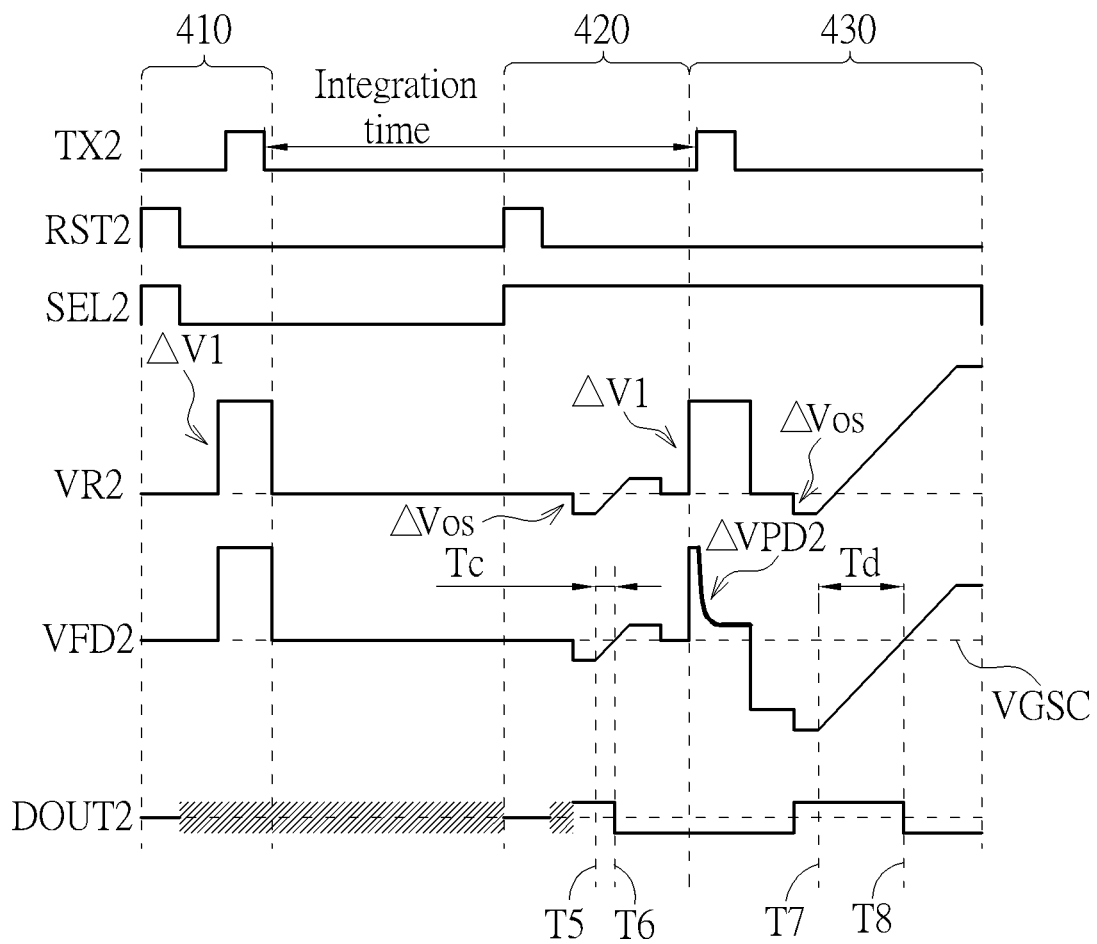
FIG. 4 is a diagram illustrating associated signals of the architecture shown in FIG. 3 according to an embodiment of the present invention.

Please refer to FIG. 4 in conjunction with FIG. 3, where FIG. 4 is a diagram illustrating control signals {TX2, RST2, SEL2}, the FD signal VFD2, the ramp signal VR2 and the output signal DOUT2 shown in FIG. 3 according to an embodiment of the present invention. Note that, the control signals {TX2, RST2, SEL2} are illustrated as logic signals in FIG. 4, but the present invention is not limited thereto.

During a reset phase of the pixel circuit 300, such as a phase 410, when the control signals RST2 and SEL2 are high and the control signal TX2 is low, the transistor M22 and the transistor M32 may be turned on to reset the FD node FD2 (e.g. the FD signal VFD2) to a specific voltage level, for example, a voltage level VGSC, which may be a bias voltage level of the transistor MC based on the bias current provided by the transistor MB2. When the control signal TX2 turns to high and a voltage level of the ramp signal VR2 increases by a voltage increment ΔV1, the photodiode PD2 may be reset to a voltage level VGSC+ΔV1, and after the control signal TX2 turns to low, the photodiode PD2 may start to accumulate charges in response to incident radiation, to generate a photodiode signal VPD2 as shown in FIG. 3, for example, the voltage level of the photodiode may be reduced from VGSC+ΔV1 due to electrons generated by the incident radiation, but the present invention is not limited thereto.

During a read-out phase of a reference signal of the pixel circuit 300, such as a phase 420, when the control signals RST2 and SEL2 are high and the control signal TX2 is low, the FD signal VFD2 may be set to the voltage level VGSC, which may represent the reference signal. After the control signal RST2 turns to low, a voltage drop ΔVos of the ramp signal VR2 may be applied to the control voltage terminal of the pixel circuit 300 to slightly pull down the FD signal VFD2, in order to guarantee that the voltage level of the FD signal VFD2 is less than the voltage level VGSC at the beginning. Then, the voltage level of the ramp signal VR2 may start to increase by a specific slope at a time point T5, and the voltage level of the FD signal VFD2 may accordingly increase, where the voltage level of the FD signal VFD2 may become greater than the voltage level VGSC at a time point T6. More particularly, the transistor MC may pull down the output signal DOUT2 of the pixel circuit 300 to generate a voltage transition of the output signal DOUT2 at the time point T6, where relative time information of the time point T6 with respect to a reference time point such as the time point T5 (e.g. a time difference Tc between the time points T5 and T6) may indicate detection information carried by this reference signal. For example, the transistor MC may generate the voltage transition of the output signal DOUT2 in response to a condition of the voltage level of the FD node FD2 (e.g. the FD signal VFD2) becoming greater than the voltage level VGSC.

During a read-out phase of the photodiode signal VPD2 of the pixel circuit 300, such as a phase 430, when the control signal RST2 is low and the control signal SEL2 is high, the FD signal VFD2 may be pulled up to the voltage level VGSC+ΔV1 before transmitting the photodiode signal VPD2 to the FD node FD2 from the photodiode PD2. After the control signal TX2 turns to high, the photodiode signal VPD2 may be transmitted to the FD node FD2, and the voltage level of the FD signal VFD2 may be accordingly reduced from VGSC+ΔV1 to VGSC+ΔV1−ΔVPD2. Note that, a time period between a first time point that the control signal TX2 turns to low during the phase 410 and a second time point that the control signal TX2 turns to high may indicate an integration time (e.g. time for accumulating charges) of the pixel circuit 300, but the present invention is not limited thereto. After the photodiode signal VPD2 is transmitted to the FD node FD2, the voltage increment ΔV1 applied to the control voltage terminal may be removed, for example, the voltage level of the FD signal VFD2 may be reduced from VGSC+ΔV1−ΔVPD2 to VGSC−ΔVPD2, and then the voltage drop ΔVos may be applied to the control voltage terminal of the pixel circuit 300 to slightly pull down the FD signal VFD2. Then, the voltage level of the ramp signal VR2 may start to increase by the specific slope at a time point T7, and the voltage level of the FD signal VFD2 may accordingly increase, where the voltage level of the FD signal VFD2 may become greater than the voltage level VGSC at a time point T8. More particularly, the transistor MC may pull down the output signal DOUT2 to generate a voltage transition of the output signal DOUT2 at the time point T8, where relative time information of the time point T8 with respect to a reference time point such as the time point T7 (e.g. a time difference Td between the time points T7 and T8) may indicate detection information carried by the photodiode signal VPD2. For example, the transistor MC may generate the voltage transition of the output signal DOUT2 in response to a condition of the voltage level of the FD node FD2 (e.g. the FD signal VFD2) becoming greater than the voltage level VGSC. A final read-out signal of the pixel circuit 300 may be indicated by a difference between the time difference Tc and Td.

Note that, states (e.g. logic high and logic low) of the output signal DOUT2 shown in FIG. 4 are for illustrative purpose only, and are not limitations of the present invention. For example, exact voltage level(s) of the output signal DOUT2 may be determined by the voltage level of the FD signal VFD2, but the present invention is not limited thereto. In addition, those skilled in the art should understand that a portion of the output signal DOUT2 which is indicated by shading as shown in FIG. 4 may not affect the final read-out signal (e.g. Td−Tc), and related descriptions are omitted, for brevity.

The present invention can solve the aforementioned problems without introducing unwanted side effects, or in a way that is less likely to introduce a side effect.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pixel circuit for generating an output signal in response to incident radiation, comprising:
   a photodiode, arranged to accumulate charges in response to the incident radiation, to generate a photodiode signal;
   a comparator circuit, arranged to generate the output signal according to a voltage level of a specific node within the pixel circuit during a read-out phase of the pixel circuit;
   a capacitor, coupled between a control voltage terminal of the pixel circuit and the specific node, wherein a ramp signal is applied to the control voltage terminal during the read-out phase, to generate a voltage transition of the output signal at a specific time point;
   a first switch circuit, coupled between the photodiode and the specific node;
   a second switch circuit, coupled between the specific node and an output terminal of the pixel circuit; and
   a third switch circuit, coupled between the output terminal and the comparator circuit;
   wherein the comparator circuit comprises a transistor; and a gate terminal, a drain terminal and a source terminal of the transistor are coupled to the specific node, the third switch circuit and a reference voltage, respectively;
   wherein the second switch circuit and the third switch circuit are turned on to reset the specific node to a specific voltage level during a reset phase of the pixel circuit;
   wherein the ramp signal that is applied to the control voltage terminal during the read-out phase pulls up the voltage level of the specific node from a first voltage level to a second voltage level, and the voltage transition of the output signal is generated in response to a condition of the voltage level of the specific node becoming greater than the specific voltage level.

2. The pixel circuit of claim 1, wherein relative time information of the specific time point with respect to a reference time point indicates detection information carried by the photodiode signal or a reference signal.

3. The pixel circuit of claim 1, wherein each of the first switch circuit, the second switch circuit and the third switch circuit comprises at least one transistor.

4. The pixel circuit of claim 1, wherein the specific node is a floating diffusion node.

5. A pixel circuit for generating an output signal in response to incident radiation, comprising:
   a photodiode, arranged to accumulate charges in response to the incident radiation, to generate a photodiode signal;
   a comparator circuit, arranged to generate the output signal according to a voltage level of a specific node within the pixel circuit during a read-out phase of the pixel circuit;
   a capacitor, coupled between a control voltage terminal of the pixel circuit and the specific node, wherein a ramp signal is applied to the control voltage terminal during the read-out phase, to generate a voltage transition of the output signal at a specific time point;

a first switch circuit, coupled between the photodiode and the specific node;

a second switch circuit, coupled between the specific node and an output terminal of the pixel circuit; and a third switch circuit, coupled between the output terminal and the comparator circuit;

wherein the comparator circuit comprises a transistor; and a gate terminal, a drain terminal and a source terminal of the transistor are coupled to the specific node, the third switch circuit and a reference voltage, respectively;

wherein the second switch circuit and the third switch circuit are turned on to reset the specific node to a specific voltage level during a reset phase of the pixel circuit;

wherein the specific voltage level is a bias voltage level of the transistor based on a bias current that is provided by a current source.

* * * * *